United States Patent [19]

Marshall

[11] Patent Number: 5,004,098
[45] Date of Patent: Apr. 2, 1991

[54] CONVEYOR BELT
[75] Inventor: Gary C. Marshall, Oil City, Pa.
[73] Assignee: Joy Technologies Inc., Pittsburgh, Pa.
[21] Appl. No.: 341,613
[22] Filed: Apr. 21, 1989
[51] Int. Cl.[5] ............................................. B65G 15/34
[52] U.S. Cl. .................................. 198/847; 198/821; 198/957
[58] Field of Search ............... 198/847, 957, 846, 818, 198/820, 821

[56] References Cited
U.S. PATENT DOCUMENTS

| | | | |
|---|---|---|---|
| 2,712,332 | 7/1955 | Annerhed | 198/847 |
| 3,615,152 | 10/1971 | Bouzat et al. | 198/818 X |
| 3,900,627 | 8/1975 | Angioletti et al. | 198/847 X |
| 4,387,801 | 6/1983 | Hoover | 198/847 X |
| 4,410,082 | 10/1983 | McGinnis | 198/847 X |
| 4,474,289 | 10/1984 | Densmore | 198/818 |
| 4,637,511 | 1/1987 | Johnson et al. | 198/846 |
| 4,770,290 | 9/1988 | Eroskey et al. | 198/847 |
| 4,819,791 | 4/1989 | Melandor | 198/818 |

FOREIGN PATENT DOCUMENTS 293989 12/1988 European Pat. Off. ............ 198/847

Primary Examiner—H. Grant Skaggs
Assistant Examiner—Cheryl L. Gastineau
Attorney, Agent, or Firm—Kirkpatrick & Lockhart

[57] ABSTRACT

An elongatable conveyor belt having an internal stretch limiter is disclosed. The conveyor belt includes a lower layer of transverse reinforcing cords and an upper layer of transverse reinforcing cords disposed at opposing angles relative to the transverse axis of the conveyor belt. Preferably, depressions are formed in the upper transverse reinforcing cords to facilitate troughing of the conveyor belt. An internal stretch limiter such as an angularly woven fabric, sinusoidally disposed cords or stretchable cords are provided only in the central region of the belt. Because stretch limiting devices are only provided in the center of the conveyor belt, the belt remains in tension to retain material thereon during horizontal curves while enabling the outer edge to elongate to negotiate the curve.

6 Claims, 2 Drawing Sheets

CONVEYOR BELT

BACKGROUND OF THE INVENTION

1. Field of the Invention

The present invention relates to conveyor belts and, in particular, to a conveyor belt having an internal stretch limiting means disposed only in the center portion of the belt to allow a controlled amount of tension in the belt while permitting the belt edges to remain in tension when traversing horizontal curves.

2. Description of the Prior Art

As is known, conveyor belts have been developed for travelling through an orbit with a generally horizontally extending conveying run overlying a generally horizontally extending return run with the conveying and return runs being stretched or elongated to provide tension in the sides of the conveying run so that such sides remain in tension as the conveying run traverses a horizontal curve. A description of such a tensioned conveyor belt is set forth in U.S. Pat. No. 4,387,801 wherein one embodiment of a conveyor belt is disclosed and described having a selected limited elongation for establishing the overall length of an orbital conveyor belt. Such conveyor belt elongation is obtained by fastening an orbital drive chain to the resilient conveyor belt with the belt in its relaxed or slacked condition, i.e., without any longitudinal tension being applied to the belt runs, with a specific spatial relationship between adjacent links of the chain. When such a chain is longitudinally tensioned, as is the case when supported for travel through an orbital path, the slack between adjacent links of the chain is eliminated or taken up and the chain becomes taut. The slack eliminating tension of the chain also simultaneously elongates the conveyor belt to the same linear extent as the chain is elongated when moving from a slack to a taut condition. Thus, a preselected elongation is achieved in the conveyor belt as determined by the total slack between adjacent links of the chain.

A somewhat similarly functioning conveyor belt is disclosed in U.S. Pat. No. 4,474,289. In such patent, a control member is provided to allow for a uniform longitudinal tension in a conveyor belt. Specifically, the control member comprises an elongated endless multisection strap consisting of bowed portions located between anchored or fixed portions which fixed portions are secured to the underside of an orbital elongatable conveyor belt. The bowed sections of the strap form a series of bowed portions throughout the length of the conveyor belt such that upon proper tensioning, stretching or elongation of the belt and strap assembly for orbital movement, the longitudinal movement of the strap causes each of the bowed portions to flatten and extend longitudinally between adjacent fixed portions with the maximum orbit length of the conveyor belt being determined by the length of the so-flattened strap.

An alternative form of conveyor belt is shown in U.S. Pat. No. 4,410,082. In certain embodiments of the conveyor belts disclosed in such patent, there is provided across the belt cross section a layer of square woven stretch fabric. Such layer extends from one edge of the belt to the other and has the property of stretching a predetermined distance when subject to tension during the initial stretching of the belt and then its resistance to further elongation increases rapidly to resist any appreciable stretching of the belt in operation.

In U.S. Pat. No. 4,770,290, there is disclosed an apparatus and method that produces a conveyor belt made of polyurethane wherein longitudinal reinforcement strands are disposed across the entire width of the belt body proper to allow for a limited stretching of the belt. The strands are given a wavy or serpentine preform which allows the desired stretch of the conveyor belt. As an alternative, a single ply fabric with sufficient wavy resiliency in its weave may be cast within the body of the polyurethane belt to provide for limited stretching of the conveyor belt. However, in such embodiment, the fabric is disclosed as having a square weave and traverses the entirety of the belt cross section. A suggested modification of the wavy strands is to provide strands of fibers that are linear in disposition but have limited stretch in the longitudinal direction and are embedded in the polyurethane to control the stretch. However, in each embodiment of the invention disclosed in such patent, the stretch limiting means is provided across the entire cross section of the belt.

I have discovered, however, that if a stretch limiting means is provided across the entire width of a conveyor belt and the belt is tensioned to the predetermined limit, the belt cannot traverse horizontal curved because the outer edge of the belt in the curve cannot elongate to the extent necessary to traverse the curve.

The subject invention is directed toward an improved conveyor belt having an internal stretch limiting means disposed only in the center portion of the belt to allow for sufficient tensioning thereof to a predetermined extent while allowing the belt edges to elongate sufficiently to traverse horizontal curves.

SUMMARY OF THE INVENTION

In accordance with the present invention, there is provided a conveyor belt capable of traversing horizontal curves during its conveying run while still allowing for retention of the material to be conveyed thereon. The conveying belt provided includes a stretchable or elongatable elastomeric material having a lower ply of angularly oriented reinforcement cords and an upper ply of oppositely angularly oriented reinforcement cords having parallel lateral deflected portions to allow for hinging of the belt sides to enhance belt troughing.

An internal stretch limiting means is provided in the center portion only of the conveyor belt. The internal stretch limiting means may comprise a flattened woven tube of a strong fiber such as an aramid fiber. Alternatively, the internal stretch limiting means may include loosely laid cords in the center portion only of the conveyor belt which straighten along the longitudinal length of the conveyor belt when the belt is tensioned or may comprise longitudinal cords which may stretch to a limited extent.

By virtue of the provision of internal stretch limiting means, the instant conveyor belt may be driven by conventional drive rollers without the necessity for a supplemental drive belt or a comparatively noisy drive chain means. In addition, because the stretch limiting means is concentrated in the central region of the belt, the belt as a whole may be tensioned to maintain tension in the inner edge of the belt during curves, but will allow the outer edge to elongate even further to allow the belt to negotiate the curve.

These and other details, objects and advantages of the invention will become apparent as the following description of the present preferred embodiment thereof proceeds.

BRIEF DESCRIPTION OF THE DRAWINGS

In the accompanying drawings, I have shown a present preferred embodiment of the invention wherein.

DETAILED DESCRIPTION OF THE PREFERRED EMBODIMENTS

Figure 1:
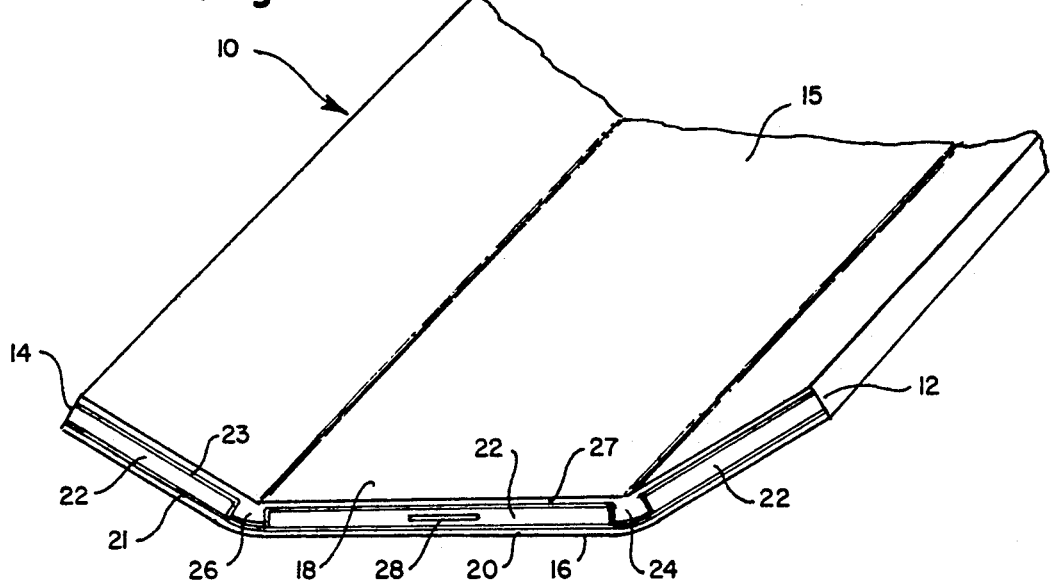
FIG. 1 is an isometric view of a portion of the conveyor belt according to the present invention.
Figure 2:
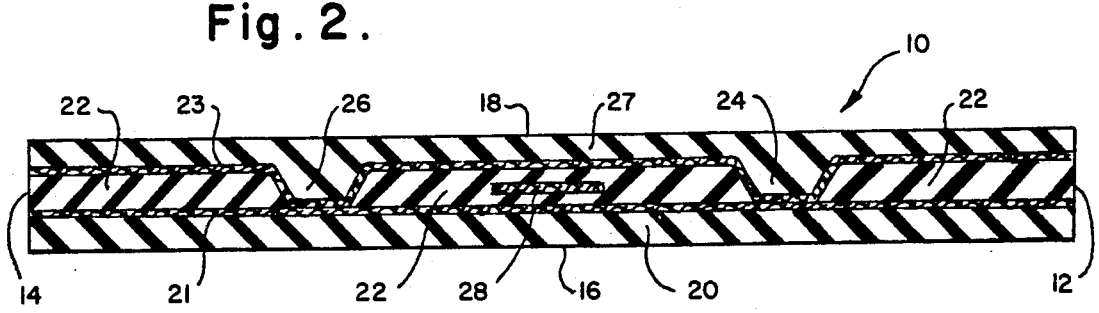
FIG. 2 is a sectional view of the conveyor belt disclosed herein.
Figure 3:
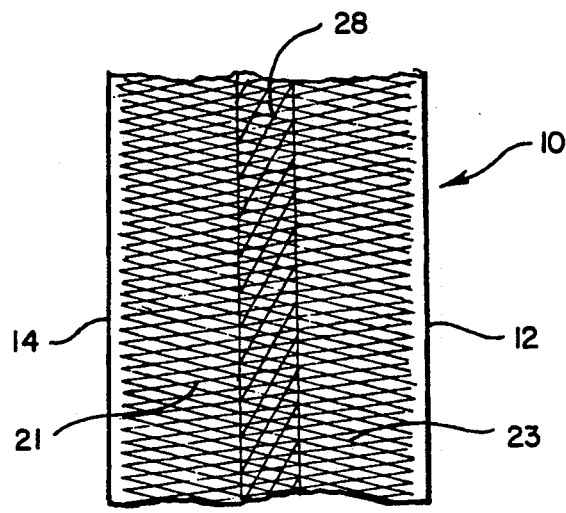
FIG. 3 is a plan view representation of certain components of the present invention.

Referring now to the drawings wherein the showings are for purposes of illustrating the present preferred embodiments of the invention only and not for purposes of limiting same, the figures show a conveyor belt generally designated as 10.

As is known, conveyor belts may be formed from materials such as natural rubber or various rubber compounds such as neoprene, which materials will be referred to herein as "rubber", as well as reinforcing materials. Conveyor belts, such as those previously used in conveying coal and the elongatable belts 10 with which the internal stretch limiting means of this invention is used, commonly comprise a plurality of elongated belt sections joined at each end to an end of an adjacent elongated section by means of a connector to form an elongated orbital conveying belt 10. Such conveyor belts 10 provide an upper conveying run which overlies a return run with the end portions of the orbital belt 10 travelling over belt reversing end rollers. Such belts 10 are typically frictionally driven by suitable means connectable to shafts on the end rollers. Additionally, rollers are typically provided along the length of the belt 10 and may cause the belt 10 to traverse a varied horizontal and vertical path which may particularly include horizontal curves. Further, side rollers may be provided to deflect the lateral edges 12 and 14, respectively, of the belt 10 in order to retain material in the central portion 15 thereof. The conveyor belt 10 includes a lower surface 16 which may be engaged by the driving and/or support rolls and an upper surface 18 on which the material to be conveyed may be placed.

The structure of the conveyor belt 10 includes a lower or first rubber body component 20 upon which a first layer of angularly disposed reinforcing cords 21 are provided. The first layer of reinforcing belts or cords is preferably of a metallic material such as steel and is disposed at an angle of approximately $7\frac{1}{2}°$ relative to the transverse axis of the conveyor belt 10. The conveyor belt 10 further includes an intermediate rubber body component, shown generally as 22. In addition, a second or upper layer of transverse metallic reinforcing cords 23 is provided substantially above the intermediate component 22 within the conveyor belt structure 10. The second layer of transverse reinforcing cords 23 is disposed at an opposite angle relative to the angular disposition of lower layer of reinforcing cords 21. Additionally, depressed areas 24 and 26 are preferably provided within the second layer of reinforcing cords 23. As will be appreciated by those skilled in the art, depressed areas 24 and 26 within second reinforcing layer 23 serve to act as hinges in order that the conveyor belt 10 may be troughed by rollers to better retain conveyed material thereon because the belt 10 is more flexible in such areas. A rubber body component 27 is provided in the upper portion of belt 10.

In accordance with one embodiment of the present invention, I choose to provide an internal stretch limiting means, generally shown as 28, in the lateral center of the intermediate body section 22. Internal stretch limiter 28 preferably comprises a tube of cross or angularly woven high strength fibers which is flattened in cross section when embedded into the belt 10. Internal stretch limiter 28 is disposed in the intermediate body component 22. Preferably, the tube is formed of an aramid fiber such as that sold under the trademark KEVLAR ® by E. I. DuPont de Nemours & Company. The weave of the stretch limiter 28 has the property of stretching a predetermined distance when subject to tension during the initial stretching of the belt 10, and then its resistance to further elongation increases rapidly to resist any appreciable stretching of the belt 10 in operation. However, I have realized that it is important to limit the placement of the internal stretch limiting means to only the central portion of the conveyor belt 10 as viewed in cross section. In particular, I prefer that the internal stretch limiting means extend less than half of the width of the conveyor belt 10 and, more preferably, less than one-tenth of the belt 10 width.

Figure 4:
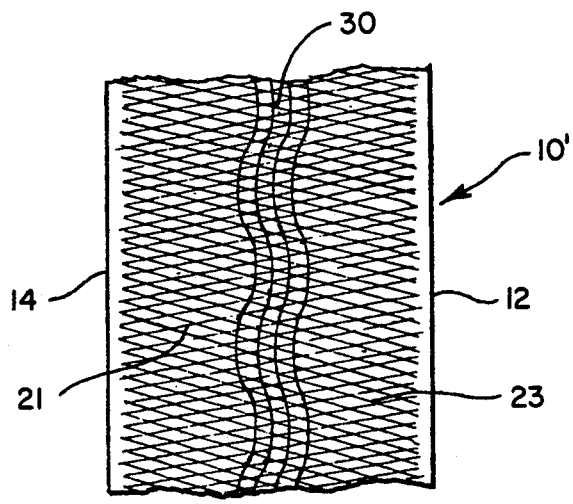
FIG. 4 is a plan view representation of certain components of an alternative embodiment of the invention.

In an alternative embodiment of the present invention, shown as 10' in FIG. 4 (wherein like reference numerals denote like components), I choose to provide an internal stretch limiting means in the form of sinusoidally disposed cords 30 of a high strength material such as KEVLAR ®. Again, however, the cords 30 are only disposed in the central portion of the conveyor belt 10' and are embedded therein. When the conveyor belt 10' is placed under tension, the sinusoidally disposed cords 30 are stretched into longitudinal alignment with the conveyor belt 10'. However, when the cords 30 are so straightened their resistance to further elongation increases rapidly to resist any appreciable further stretching of the conveyor belt 10' in operation.

Figure 5:
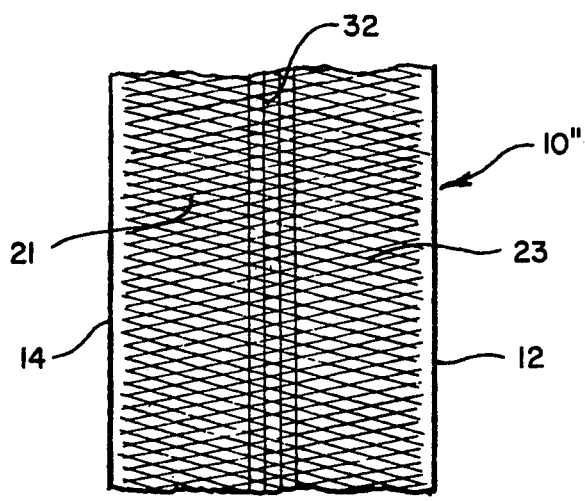
FIG. 5 is a plan view representation of certain components of another alternative embodiment of the invention.

In another alternative embodiment of the invention, shown as 10" in FIG. 5 (wherein like reference numerals denote like components), I provide an internal stretch limiting means in the form of elongatable cords 32. Elongatable cords 32 extend longitudinally throughout belt 10" and are preferably formed from a high strength material such as KEVLAR ® but are of a woven construction so as to allow the cords 32 to stretch to a predetermined extent then resist further stretching. As in the other embodiments of this invention, t-he elongatable cords 32 are only disposed in the central portion of the conveyor belt 10". As such, when the conveyor belt 10" is placed under tension, the elongatable cords 32 may stretch to a predetermined extent, e.g., 10% or preferably 8%, then they resist further elongation.

In forming the conveyor belts 10 10' or 10" in accordance with the present invention, I choose to employ a high grade rubber or synthesized rubber such as neoprene for the lower, intermediate and upper body portions, 20, 22 and 27 of the conveyor belt and to form the internal stretch limiter 28 or the stretch limiting cords 30 or 32 from a material such as KEVLAR ®. Preferably, the various components of the belt 10, 10' or 10" are laid out and then passed through a vulcanizing press and the belt is vulcanized at a temperature of approximately 300° F. and at a pressure of 300 p.s.i. for approximately one hour. During such a process, the rubber-like material passes into the interstices between the cords in the lower and upper reinforcing layers 21 and 23, respectively, and in the stretch limiting means 28, 30 or 32, as the case may be.

I have discovered that the conveyor belts produced in accordance with the present invention serve to provide an internal stretch limiting means which allows the conveyor belts 10, 10' or 10" to be elongated by a predetermined distance; however, once the predetermined amount is reached, resistance to further elongation increased rapidly. I prefer the belt 10, 10' or 10" to be elongatable only up to 10% and preferably 8%, during installation and start-up of the belt. Because I do not provide stretch limiting means in the lateral side areas of the conveyor belt, the belt, after tensioning, allows tension to be maintained in the inner edge of a horizontal curve to maintain the conveyed material thereon, while allowing the outer edge to be further elongated to allow the belt 10, 10' or 10" to negotiate a horizontal curve.

It will be understood that various changes in the details, materials and arrangements of parts which have been herein described and illustrated in order to explain the nature of the invention may be made by those skilled in the art within the principle and scope of the invention as expressed in the appended claims.

What is claimed is:

1. A stretchable conveyor belt, comprising:
  a. an elongated elastomeric body having spaced-apart edges, edge portions along said edges, a load-carrying belt surface on one side of said body extending between said edges and a drivable surface on the other side of said body;
  b. a first layer of reinforcing cords extending from one of said edges to the other of said edges laid on a bias to the transverse axis of the belt;
  c. a second layer of reinforcing cords coextensive with and positioned above said first layer and laid at an opposite bias angle to the cords of said first layer; and
  d. stretch limiting means provided between said first and second layers in the lateral center of said belt and extending less than one-half of the width of said belt, said stretch limiting means having the property of stretching a predetermined distance when subject to tension and then having a rapidly increasing resistance to further elongation of the belt in operation, said stretch limiting means comprising an elongated fabric member constructed of angularly woven, high strength fibers.

2. The conveyor belt of claim 1 in which said stretch limiting means extends less than 10% of the width of said belt.

3. A stretchable conveyor belt, comprising:
  a. an elongated elastomeric body having spaced-apart edges, edge portions along said edges, a load-carrying belt surface on one side of said body extending between said edges and a drivable surface on the other side of said body;
  b. a first layer of reinforcing cords extending from one of said edges to the other of said edges laid on a bias to the transverse axis of the belt;
  c. a second layer of reinforcing cords coextensive with and positioned above said first layer and laid at an opposite bias angle to the cords of said first layer; and
  d. stretch limiting means provided between said first and said second layers in the lateral center of said belt and extending less than one-half of the width of said belt, said stretch limiting means having the property of stretching a predetermined distance when subject to tension and then having a rapidly increasing resistance to further elongation of the belt in operation, said stretch limiting means comprising an elongated fabric member constructed of angularly woven, high strength fibers, said fabric member comprising a woven tube of fabric which is compressed to a flattened form during the formation of said belt.

4. The conveyor belt of claim 3 in which said fabric comprises aramid fibers.

5. The conveyor belt of claim 3 in which said fabric comprises KEVLAR ® fibers.

6. A stretchable conveyor belt, comprising:
  a. an elongated elastomeric body having spaced-apart edges, edge portions along said edges, a load-carrying belt surface on one side of said body extending between said edges and a drivable surface on the other side of said body;
  b. a first layer of reinforcing cords extending from one of said edges to the other of said edges laid on a bias to the transverse axis of the belts;
  c. a second layer of reinforcing cords coextensive with and positioned above said first layer and laid at an opposite bias angle to the cords of said first layer; and
  d. a stretch limiting means provided between said first and second layers in the lateral center of said belt and extending less than one-half of the width of said belt, said stretch limiting means having the property of stretching a predetermined distance when subject to tension and then having a rapidly increasing resistance to further elongation of the belt in operation, said stretch limiting means comprising a plurality of laterally spaced cords constructed of woven, high strength fibers.

* * * * *

UNITED STATES PATENT AND TRADEMARK OFFICE
CERTIFICATE OF CORRECTION

PATENT NO. : 5,004,098

DATED : April 2, 1991

INVENTOR(S) : Gary C. Marshall

It is certified that error appears in the above-identified patent and that said Letters Patent is hereby corrected as shown below:

Col. 4, line 54, delete "t-he" and substitute --the-- therefor.

Col. 4, line 60, after "belts 10" insert --,--.

Col. 6, line 47, after "d." delete "a".

Signed and Sealed this

Thirteenth Day of October, 1992

Attest:

DOUGLAS B. COMER

Attesting Officer     Acting Commissioner of Patents and Trademarks